PULSE TRANSMITTER SYNCHRONIZING SYSTEM

Filed May 14, 1945 3 Sheets-Sheet 1

INVENTOR.
GLENN H. MUSSELMAN
BY
Ralph L. Chappell
ATTORNEY.

Sept. 30, 1952 G. H. MUSSELMAN 2,612,601

PULSE TRANSMITTER SYNCHRONIZING SYSTEM

Filed May 14, 1945 3 Sheets-Sheet 2

INVENTOR.
GLENN H. MUSSELMAN

BY Ralph L. Chappell

ATTORNEY.

INVENTOR.
GLENN H. MUSSELMAN
BY
Ralph L. Chappell
ATTORNEY.

Patented Sept. 30, 1952

2,612,601

UNITED STATES PATENT OFFICE 2,612,601

PULSE TRANSMITTER SYNCHRONIZING SYSTEM

Glenn H. Musselman, Boston, Mass., assignor, by mesne assignments, to the United States of America as represented by the Secretary of the Navy Application May 14, 1945, Serial No. 593,606

11 Claims. (Cl. 250—6)

This invention relates to a means for maintaining a recurrent series of pulse emissions from a radio transmitter in a known time relationship with a similar recurrent series of pulse emissions from a relatively distant radio transmitter.

As hereinafter described the invention functions principally as a means for maintaining a known time interval between the pulse emissions from a remote radio transmitter and those from a local transmitter, both of which are arranged to operate at the same pulse recurrence frequency. A simplified arrangement, however, is also shown for the purpose of illustrating the practicability of the invention as a means for holding the respective pulse signals in synchronism.

It is an object of this invention to provide a means for maintaining a known time relation between the pulse emissions from a local radio transmitter and those from a remote transmitter.

It is another object of this invention to provide a means for maintaining a known time interval between the reception of pulse emissions from a remote radio transmitter and those from a local transmitter.

It is another object of this invention to provide a means for causing the pulse emissions from a local radio transmitter to occur synchronously with those from a remote transmitter.

It is another object of this invention to provide a warning signal, should the phase relationship between pulses from the synchronized transmitters separated by a relatively great distance vary from the present time difference.

Other objects and features of the present invention will become apparent upon a careful consideration of the following detailed description when taken together with the accompanying drawings.

For purposes of illustration the invention will be shown and described as applicable for use in conjunction with the apparatus shown in the patent application of Jabez C. Street, John A. Pierce and Donald E. Kerr entitled "Long Range Navigation System" Serial No. 599,163 filed June 13, 1945. This system of navigation requires two land stations sending out pulsed, powerful, radio signals at different instants and at exactly the same rate. Further it requires that the time interval elapsing between the two said signals be very accurately held within one microsecond of some predetermined figure, which is here called, for sake of convenience, "time difference." For obvious reasons, the station assigned the responsibility for maintaining this "time difference" is called the "slave" and the other station of the pair is called the "master."

In addition to its principal function of providing a means for maintaining a known time relation between a pair of pulse signals emanating from a pair of distinct points of transmission, this invention also provides a warning signal which is sounded whenever the desired time relation between the respective pulse signals is lost beyond control.

Figure 1:
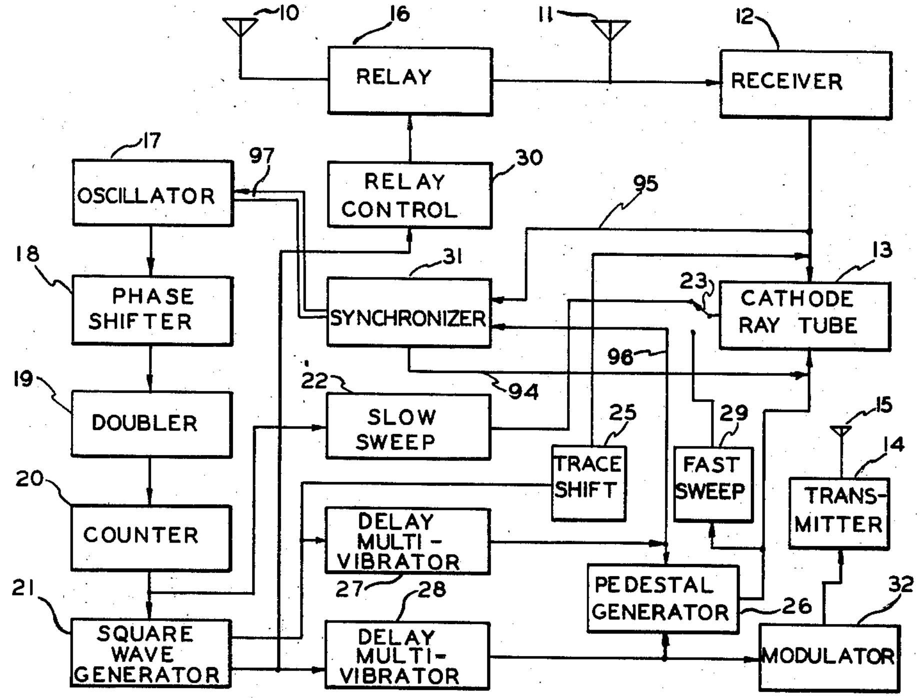
Fig. 1 is a block diagram showing a radio pulse timer and transmitter system in which the invention may be embodied.

Reference is now had in particular to Fig. 1 where the apparatus of this invention is represented in general by the block 31 labeled "synchronizer," and is shown embodied in the "slave" transmitter of the aforesaid navigation system. In operation, the distant pulse signal is picked up by a pair of antennas, 10 and 11, and fed to the input of a superheterodyne receiver 12 where the signal is detected, amplified. and applied vertically to a first horizontal sweep line on the cathode ray tube 13. Thereafter, the local transmitter 14 sends out a pulse from the antenna 15 which is received by the local antenna 11 alone, antenna 10 at this instant being shorted out by the operation of the relay 16, and is applied vertically through the receiver 12 to a second horizontal sweep on the cathode ray tube 13.

These sweeps are produced by the slow sweep generator 22, which is keyed by the counter circuit 20. The latter is arranged to produce suitable positive keying pulses at a frequency equal to twice the recurrence frequency at which it is desired to operate the transmitter 14, so that, each sweep produced on the cathode ray tube in response to these keying pulses is equal in duration to one half the time interval elapsing between the pulse signals emitted by the transmitter 14 and are arranged so that the second sweep is actually a repetition of the first sweep, except that it is displaced downward in a lower horizontal plane from the first sweep as will be described later. To control the production of these sweeps and also the operation of transmitter 14, as will be described hereinafter, the counter 20 is arranged to be driven by a 50 kc. oscillator 17 working through a phase shifter 18, a doubler and a locked blocking oscillator 19 which is tuned to operate at 100 kc. The oscillator 17 is preferably a crystal controlled type whose frequency is stabilized by disposing its crystal and certain other related R. F. components in a constant temperature oven. The phase shifter 18 is of any known variety capable of producing, upon manual adjustment, 360° phase shift in the oscillator output, and is arranged, for instance, so as to key the first blocking oscillator at the very peaks of the positive half cycles of output therefrom. In this way, the phase shifter 18 may be adjusted to produce any conceivable phase shift in the blocking oscillator output (360° for example), and consequently a reduced phase shift in the pulse output from counter 20, depending upon the counting factor of the latter. Then if it is desired to operate the transmitter 14 at a rate of say 25 pulses per second, the output of the counter 20 will be set at 50 pulses per second, and will be fed in parallel to the slow sweep generator 22 and the square wave generator 21. The former is simply a saw-tooth voltage generator such as a non-conducting, gas-filled triode vacuum tube, having a plate load resistance and a charging condenser connected between its plate and cathode. Its output which is taken from the plate is coupled to the horizontal deflecting plates of the cathode ray tube 13. Thus, when a positive keying pulse from the counter is applied to the grid of the triode, the charging condenser first renders a rapid discharge through the tube and thereafter starts a gradual charge through the plate load resistance of the tube to thereby move the cathode ray tube beam slowly from left to right at such a rate that when the beam just reaches the right-hand edge of the cathode ray tube, a second keying pulse strikes the grid of the triode and a second beam sweep is started. Unless some means is provided for alternately changing the bias on the vertical deflecting plates of the cathode ray tube from one value to another during the production of the sweeps there will be no way of distinguishing the first sweep from the second. For this purpose, the square wave generator 21 is provided, which is simply a two-tube Eccles-Jordan type of multivibrator. This multivibrator, as above mentioned, is also driven by the output of the counter 20 and produces on the plates of the opposite tubes thereof, a push-pull rectangular voltage wave output, having a frequency equal to one-half its keying frequency, with the half-cycles thereof equal in time duration to the cathode ray tube sweeps and synchronized therewith. The output taken from the plate of one of the tubes of the square wave generator 21 is then applied to the upper vertical deflecting plate of the cathode ray tube 13 through a trace shift circuit 25. The latter is any suitable means for regulating the amplitude of the rectangular voltage wave applied to the vertical deflecting plate, while the phase of the rectangular voltage applied thereto is such that as the counter output keys the sweep generator 22 to start the first sweep a positive voltage half cycle is applied to the upper vertical deflecting plate of the cathode ray tube 13, and a negative voltage wave is applied thereto during the production of the second sweep. Thus, it is seen that the first and second sweeps occur respectively in upper and lower horizontal planes.

To assist in the maintenance of the "time difference" in pulse emission, there is applied to each of the sweeps, a pedestal produced by the pedestal generator 26. The first occurs at a known and fixed time interval after the initiation of the first sweep and on which the distant pulse signal is to be displayed. The second occurs at a known but controllable time interval after the initiation of the second sweep and as will be seen hereafter controls the operation of the local transmitter 14. Thus, whenever, the pulse signals are positioned at corresponding points on the respective pedestals the relative positions of the latter, as observed from time markers on the sweeps on the cathode ray tube 13, will indicate the time difference in pulse emission.

To control the timing of the first pedestal, the same output voltage from the square wave generator 21 that is applied to the trace shift circuit 25 is also applied to the delay multivibrator 27 such that the leading edge of the positive half cycle therefrom which corresponds to the initiation of the first sweep, is differentiated by means not shown and applied as a keying pulse to the multivibrator 27. This multivibrator, which is preferably a known type of bias control multivibrator, produces a fixed time duration positive voltage pulse the trailing edge of which keys off the pedestal generator 26. Pedestal generator 26, which is also a known type of multivibrator, produces a fixed amplitude and time duration (about at 100 microseconds) negative pulse which is applied to the top or first sweep through the lower vertical deflecting plate of the cathode ray tube, at a time delayed from the initiation of the first sweep equal to the time duration of the positive pulse generated by the delay multivibrator 27. The phase opposed output taken from the plate of the other tube of the rectangular voltage wave generator 21 is applied to the delay multivibrator 28 such that the leading edge of the positive half cycle output therefrom, which corresponds in time to the initiation of the second sweep, is differentiated and applied as a keying pulse to the delay multivibrator 28. The latter, which is similar to multivibrator 27, produces a positive voltage pulse whose time duration is controlled, for example, by a time graduated potentiometer disposed in the circuit in a known manner, such that the trailing edge thereof keys off the pedestal generator 26 to produce a pedestal on the second beam sweep of the cathode ray tube 13, delayed in time from the initiation of the second sweep by an amount depending on the time duration of the pulse generated by the multivibrator 28. Similarly, the trailing edge of the output pulse from the delay multivibrator 28 is arranged to key the modulator 32 which forms a keying pulse of the proper time duration (usually about 9 to 20 microseconds) for setting the transmitter 14 into operation. Thus the pulse emitted by transmitter 14 will always appear on the second pedestal at a point near but not exactly at its leading edge since there will exist, for instance, a 10 or 15 microsecond cumulative delay in the transmitter and receiver circuits.

In operation, the position of the respective pedestals are first fixed at the proper points on their sweeps by adjustment of the multivibrators 27 and 28 and so as to simulate the desired time difference in pulse emissions. Thereafter the phase of the sweeps with reference to the distant signal is altered by adjustment of the phase shifter 18 until the distant pulse signal appears at a point on the first pedestal that corresponds to the position the controlled or local pulse signal occupies on the second pedestal. Then as set forth in the aforesaid patent applications, this time relation between the pulse emissions can be maintained by manual adjustment of the phase shifter 18.

For magnifying the traces where the pulses appear, a fast sweep generator 29 is provided. This is controlled by the leading and trailing edge of the pedestals to sweep only during the occurrence of these pedestals. A suitable switch 23 is provided to select the desired sweep.

Figure 2:
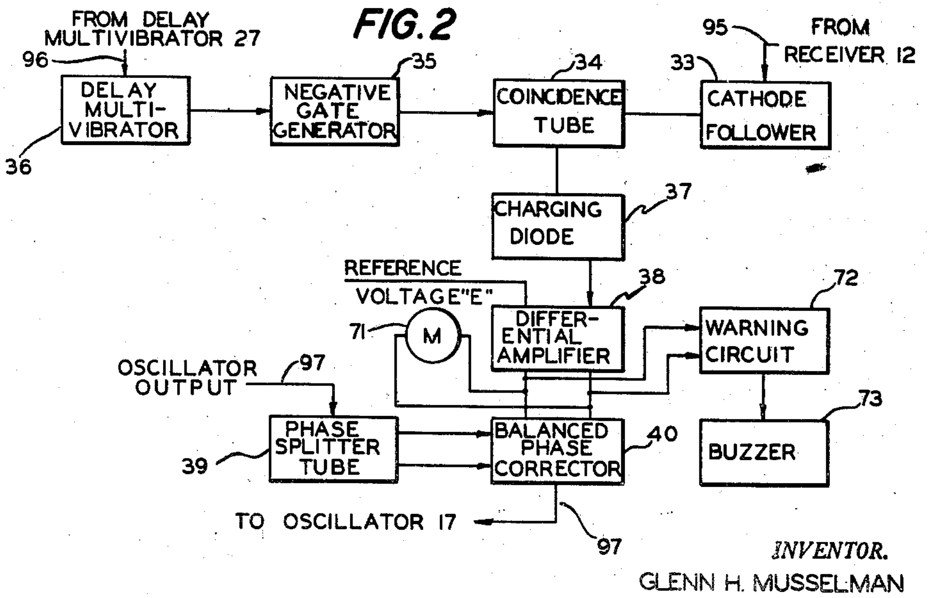
Fig. 2 is a block diagram showing integrally the component parts of the synchronizer according to the invention.

By use of the invention, indicated generally as the synchronizer 31 of Fig. 1, the components of which are illustrated in Fig. 2, this time relation may be automatically maintained. In operation of this circuit, the distant signal is detected by receiver 12 and fed through lead 95 and a cathode follower stage 33 to the control grid, for instance, of a coincidence tube 34. The latter may, for example, comprise a pentode vacuum tube which is normally held non-conducting except during the time that a negative gate pulse is applied to its cathode. The transmitted pulse signals are usually about 40 microseconds in duration so that their leading and trailing edges will not be abrupt, but more or less sloping. The negative gating pulse which unblocks the coincidence tube 34 is in the vicinity of 10 to 15 microseconds long and is produced by the negative gate generator 35 in response to the trailing edge of the output pulse from delay multivibrator 36 which in turn is keyed through lead 96 by the delay multivibrator 27 that controls the timing of the first pedestal. Thus by adjustment of the time delay of the output voltage pulse from multivibrator 36, the negative gating pulse can be phased to occur at a point say one-half way up the leading edge of the distant pulse so long as the distant pulse signal is displayed on the first pedestal. In this way, the amplitude of the output pulse from the coincidence tube 34 will vary as the negative gating pulse and the distant pulse signal move in time relative to one another, that is, the output from the coincidence tube 34 increases as the distant pulse starts to move further into the negative gate and decreases as it moves out of the negative gate. The voltage output from coincidence tube 34 is then fed to a charging diode 37 which produces a negative saw-tooth voltage, the negative swings of which depend upon the strength of the signal obtained from the coincidence tube 34, so that the depth of the teeth and also the mean voltage will vary with the relative positions of the negative gate and distance signal. It is the mean voltage of the output from the charging diode that is important, as this is balanced against a fixed reference voltage in a differential amplifier 38, which has a pair of output voltages, which may be equal, or either larger than the other depending upon whether or not this mean voltage is equal, larger or smaller than the reference voltage. Also provided is a balanced phase corrector 40 which has two pairs of inputs, the first of which is obtained from the differential amplifier 38; the other pair is two 50 kc. sine waves 180° out of phase which are obtained directly from the oscillator 17 over path 97 through the phase splitter tube 39. The output from the balanced phase corrector 40 is zero when the input from the differential amplifier is balanced. When the differential amplifier 38 input is unbalanced in one direction, the balanced phase corrector 40 feeds a 50 kc. signal into the oscillator 17 over path 97 which is 90° out of phase with the oscillator signal and 270° out of phase with the oscillator signal when unbalanced in the other direction. These out of phase, signals pull the oscillator frequency in one direction or the other and therefore serve to adjust the oscillator output frequency, and thereby automatically take over the duties of the phase shifter 18 in maintaining the desired time relation between the pulse emission.

Also shown in Fig. 2 is a meter 71 and a warning buzzer 73 connected to the output of the differential amplifier 38. The meter provides an indication of the amount of correction that the balanced phase corrector 40 is applying to the oscillator 17 while the warning circuit 72 rings the buzzer alarm 73 when the phase corrector 40 loses control of the local signal or when the distant signal fades or gives out.

Figure 3:
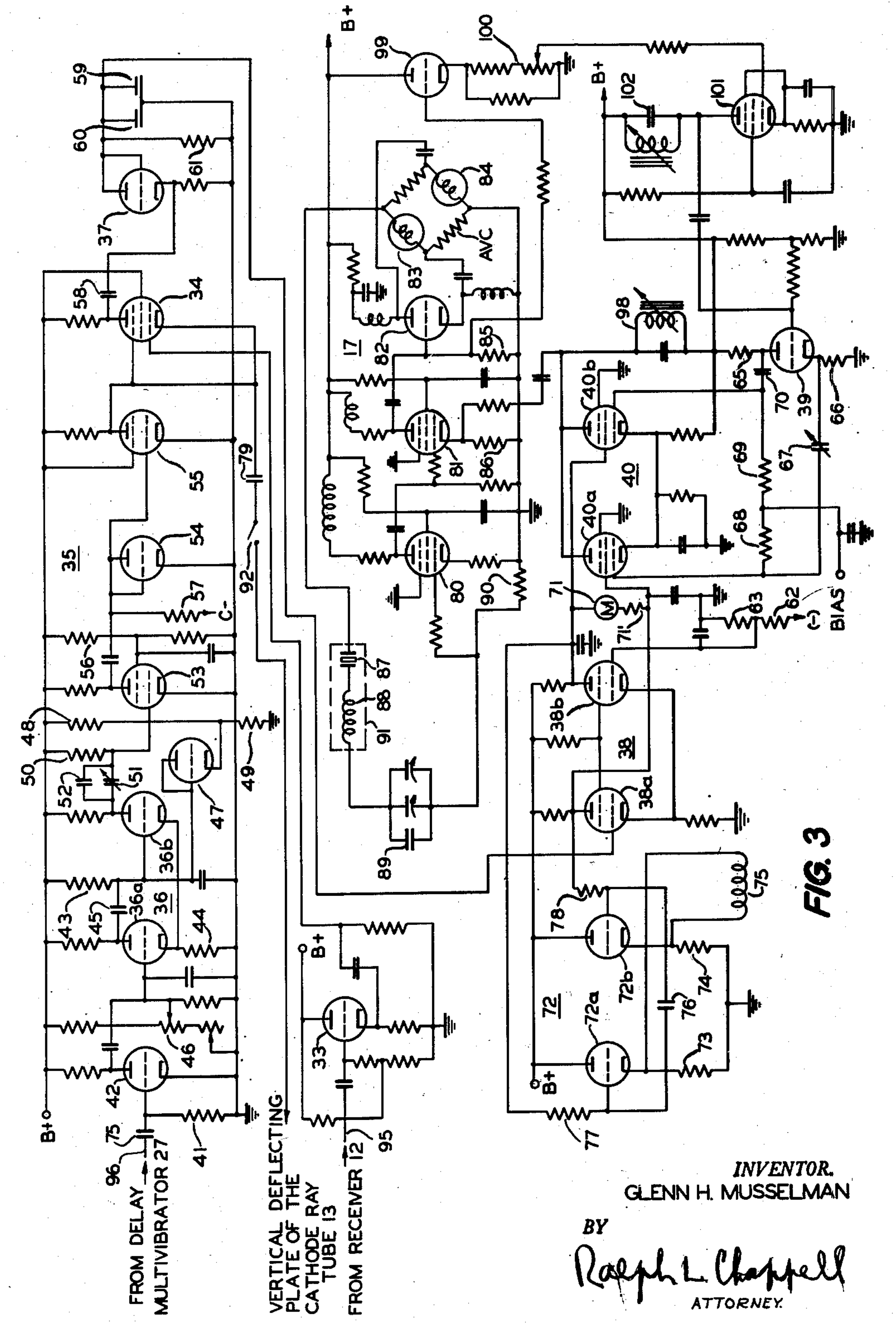
Fig. 3 is a circuit diagram showing in greater detail the apparatus shown in Fig. 2.

A detailed description of the operation of the invention will follow with reference to Fig. 3. The trailing edge of the positive output pulse from the delay multivibrator 27 is differentiated by condenser 75 and resistance 41 and applied as a negative "pip" to the grid of the amplifier tube 42. This amplifier is normally biased strongly conducting and therefore amplifies and inverts the negative "pip" applied to its grid and applies its output to the grid of tube 36*a* of the delay multivibrator 36. This multivibrator consists of normally "off" and "on" tubes, 36*a* and 36*b* respectively. The grid of the "on" tube 36*b* is returned to B+ through resistance 43 so that the plate current it draws is fairly heavy and is passed through the resistance 44 which is common to the cathodes of both tubes and therefore the voltage developed across the latter biases tube 36*a* to cut-off. The positive "pip" furnished by the amplifier 42 and appearing on the grid of tube 36*a* causes this tube to conduct. As it does so, its plate swings abruptly negative to drive the grid of tube 36*b* negative through condenser 45 and thereby render the latter tube blocked. The interval for which tube 36*b* is held blocked and consequently the time duration of the positive voltage pulse appearing on its plate depends on both the grid bias of tube 36*a*, as set by potentiometer 46, and the time constant constituted by condenser 45 and resistance 43. For example, the more positive the bias on tube 36*a*, the more current it passes through the cathode resistance 44 when it is conducting and hence the larger the voltage drop across the cathode resistance 44 which means condenser 45 has to charge to a higher value before the grid of 36*b* is raised to a potential sufficient to overcome the cathode bias. Thus, regulation of potentiometer 46 varies the amount of time tube 36*a* is held conducting and tube 36*b* non-conducting after the former has been keyed, and therefore, the time duration of the positive voltage pulse generated on the plate of tube 36*b*. The grid of tube 36*b* is connected to the plate of diode 47, whose cathode is biased by the voltage dividing action of the serially connected resistances 48 and 49 connected between B+ and ground so that when tube 36*a* returns to cut-off the positive rise in its plate voltage, which is passed on to the grid of tube 36*b*, will be shorted to ground and therefore will not permit the grid of tube 36*b* to draw current and therefore improperly bias itself to cut-off.

Figure 4:
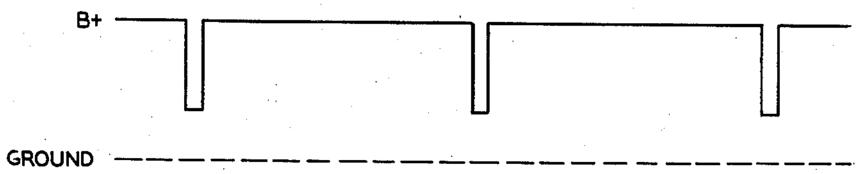
Figs. 4 and 5 show a series of voltage time plots taken to illustrate the operation of the apparatus shown in Fig. 3.

The positive pulse thus produced on the plate of tube 36*b* during its non-conducting period is differentiated by condensers 51 and 52 and resistance 50 to place first a positive and then a negative "pip" on the control grid of tube 53. The tube 53 is normally conducting due to the connection of its control grid through resistance 50 to B+. Thus the positive "pips" of the differentiated output from tube 36b will have no effect on the conduction of tube 53, but each negative "pip," which corresponds to the trailing edge of the positive voltage pulse produced on the plate of tube 36b will drive it below cut-off and hold it there until condensers 51 and 52 charge to a value sufficient to restore conduction. The time that tube 53 is held at cut-off determines the time duration of the positive voltage pulse generated in its plate, and as will subsequently be seen, controls the time duration of the negative gate pulse applied to the coincidence tube 34. The width of this gate can, of course, be regulated by adjustment of condenser 51. The sharp positive pulse thus produced on the plate of tube 53 is then passed on through condenser 56 to the grid of tube 55 where it is inverted and amplified to form the negative gate pulse. A diode 54 is connected in shunt with the input to tube 55 and prevents the grid side of condenser 56 from rising above ground, while the negative bias applied to the grid of tube 55 through resistance 57 holds it below ground. Thus, when the plate of tube 53 drives positive to about B+ in response to the trailing edge of the positive pulse produced on the plate of tube 36b, the grid of tube 55 rises to about ground potential. Thereafter, condensers 52 and 51 charge up through resistor 50, whereupon the plate of tube 53 drops negative again thus permitting the grid bias of tube 55, taken in through resistance 57, to again block tube 55. Hence, the plate of tube 55 will be seen to normally ride at B+ except during the occurrence of the sharp positive voltage pulse on the plate of tube 53. Now then since the plate of tube 55 is connected directly to the cathode of the coincidence tube 34, the cathode of the latter will likewise normally ride at B+ except during the sharp drop in plate voltage on tube 55, as shown in Fig. 4, at which time tube 34 will be free to conduct. To the control grid of the coincidence tube 34 there is applied the pulse signal from the distant station, which is taken from the receiver and fed through the cathode follower 33. Thus appearing on the plate of the coincidence tube 34 will be a series of negative "spike" voltages whose time duration is equal to the negative gate pulse obtained from the plate of tube 55 and whose whose amplitude depend upon the amplitude of that portion of the distant signal with which the negative gate pulse coincides.

Figure 5:
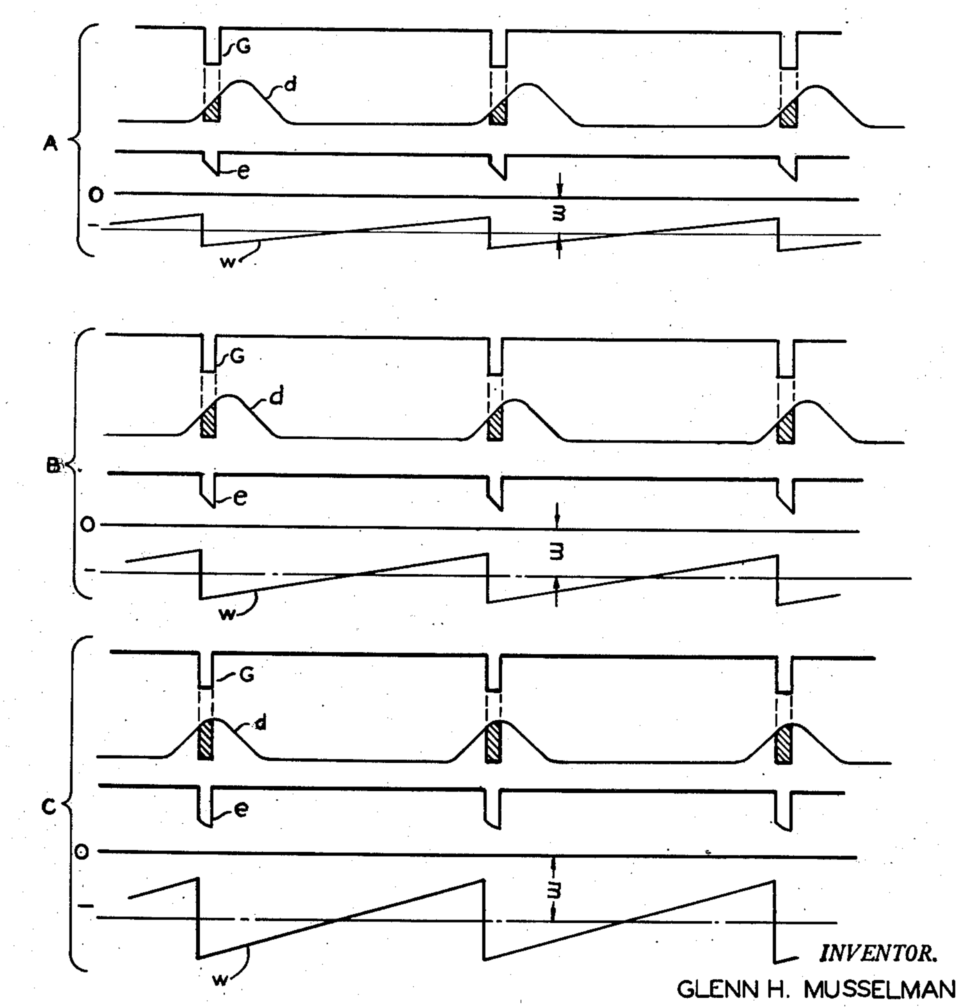

These negative spike voltages are then applied through the condenser 58 to the cathode of the charging diode 37 to render the latter conducting and thereby apply a negative charge to the condensers 59 and 60 which are disposed in the plate circuit of the diode 37. Thereafter these condensers are free to make a gradual discharge through the fixed resistance 61 to thus develop, as shown at the bottom of plots A, B, and C of Fig. 5, a negative saw-tooth voltage *w* on the plate of the diode. The teeth, i. e. the abrupt edges, of this saw-tooth voltage occur coincidental with the negative spike voltages on the plate of coincidence tube 34 and have an amplitude directly proportional to the amplitude of the negative spike voltages, while the sloping portion of the saw-tooth waves is held constant by the discharging resistor 61. Therefore the capacitors 59 and 60 and resistance 61 will function as a means for averaging the amplitude of the spike voltages developed on the plate of coincidence tube 34 to thereby produce on the plate of the diode 37 a mean negative voltage indicated as *m* whose amplitude is governed by the amplitude of the negative spike voltages developed on the plate of coincidence tube 34.

Three degrees of coincidence between the negative gate pulse and the distant signal will now be discussed. In the first, as shown in plot A of Fig. 5, the negative gate G is early and the negative spike voltages *e* developed on the plate of the coincidence tube 34 are smaller than desired so that the mean voltage *m* developed by the average circuit is smaller than desired. In the second, as shown in plot B of Fig. 5, the coincidence between the negative gate pulse G and the distant signal *d* is just right, i. e., the negative gate is disposed one-half way up the leading edge of the distant pulse signal *d*, so that the mean voltage *m* produced by the averaging circuit disposed in the plate circuit of the charging diode is just right. In the last, as shown in plot C of Fig. 5, the negative gate pulse G is late and the mean voltage *m* of the saw-tooth wave *w* produced by the averaging circuit in the charging diode is too large.

To determine whether or not the mean voltage produced by the averaging circuit is of the desired value, it is applied as a bias to control grid of tube 38a of the differential amplifier 38, and is there balanced against a fixed reference voltage E which is applied as a bias to the control grid of the tube 38b. The latter voltage has an amplitude of about 3.7 volts, for example, and is obtained from the bleeder resistances 62 and 63. Thus, the differences in plate voltages on tubes 38a and 38b depend upon the difference in their respective control grid biases which in turn is governed by the degree of coincidence between the negative gate pulse and the distant pulse signal. For example, in the first case discussed above, the negative gate pulse was assumed early so that the mean voltage developed on the plate of the coincidence tube 34, and consequently, the bias applied to the control grid of tube 38a, is positive relative to the reference voltage E applied to the control grid of tube 38b, thus making the plate voltage of tube 38b more positive than that of tube 38a. In the second case, as shown in plot B of Fig. 5, the mean voltage developed on the plate of the diode 37 is equal to the reference voltage E applied to the control grid of tube 38b thus making the plate voltages of tubes 38a and 38b equal. In the third case, as shown in plot C of Fig. 5, the negative gate pulse is late thereby causing the mean negative voltage developed on the plate of diode 37 to be more negative than the reference voltage E, thus causing the plate voltage of tube 38a to be more positive than the plate voltage of 38b. An unbalance in the plate voltages of tubes 38a and 38b indicates a drift in the desired time relation between the local pulse signal and the remote pulse signal, which means that the frequency of oscillator 17 should be pulled in one direction or the other to restore the original time relation between the two pulse signals. For this reason, there is provided a balanced phase correcting circuit 40, which operates in a manner hereinafter to be described, to pull the frequency of the oscillator 17 in the proper direction. This circuit consists of a pair of pentode tubes 40a and 40b, the plates of which are connected in parallel through a common load impedance 98 to a source of B+ and the control grids of which are coupled through the phase splitter 39 to the output of a shaping amplifier 101 which is driven from the grid of tube 82 through a cathode follower at 99.

Before the action of the balanced phase corrector is taken up, it is deemed desirable to make a statement as to what is required in order to shift the oscillator frequency. Fundamentally, frequency control of the oscillator 17 is accomplished by taking a voltage of a certain phase therefrom and feeding back a small voltage which either leads or lags the voltage taken from the oscillator by 90°. The frequency correction that takes place will have little effect on the amplitude of the oscillator output but will either increase or decrease its frequency depending on whether the feedback voltage lags or leads the oscillator voltage.

The oscillator is shown in Fig. 3 and consists of a crystal 87, an amplifier, and an automatic volume control bridge circuit. A signal applied to the amplifier, i. e., tubes 80 and 81, is amplified about 150 times and fed through the bridge circuit to drive the crystal at its natural frequency. In series with the crystal is a tuning coil 88, a resistance 90, and a bank of condensers 89 which control the frequency. The signal developed across the resistance 90 is applied to the amplifier tube 80 to thus complete the oscillator circuit.

The crystal is preferably one of low temperature coefficient and high Q (approximately 65,000), and is disposed in a thermostatically controlled temperature oven indicated at 91. The amplifier which furnishes the power to drive the oscillator, consists of two pentode tubes 80 and 81. Each tube operates in a class A condition and has a gain of about 13. Small inductances have been introduced in their plate circuits to minimize phase shift, and the unbypassed cathode resistors provides degenerative feedback to reduce distortion.

The automatic-volume control consists of a phase splitting tube 82 and a bridge composed of two fixed resistors and two lamps 83 and 84 of variable resistance. The phase splitter is a triode with equal impedances in the plate and cathode circuits. The cathode output is in phase with the input signal applied to its grid while the plate voltage is 180° out of phase with the grid signal. Since the same current will flow in plate and cathode circuits, and since the plate and cathode impedances are equal, the oscillator voltage developed on the plate and cathode are equal.

When the oscillator is turned on the lamps are cold, their resistance is low and the bridge is unbalanced so that a large signal is impressed on the crystal.

The mechanical vibration and the piezoelectric signal associated with it build up rather slowly. As these increase, so does the output signal causing the temperature and resistances of the lamps 83 and 84 to rise. As the bridge approaches balance the signal transmitted through it begins to decrease until a stable state is reached. In the stable state the bridge is slightly unbalanced, that is, the resistance of the lamps are not quite equal to the resistance of the fixed resistors, so that some signal is fed back through the bridge to the input of the amplifier. The gain of the amplifier is then equal to the losses in the tuning circuit and crystal and the attenuation of the bridge. The bridge is thus a variable attenuator which acts like an automatic volume control circuit without introducing the usual shift in phase.

In the oscillator circuit an output signal is taken from the grid resistance 85 of the phase splitter 82. Since the oscillator is extremely sensitive to loading, this output is applied to the grid of a cathode follower tube 99, the grid drawing no current. The potentiometer 100 is used to determine the amplitude of the signal applied to subsequent circuits. These subsequent circuits require a very pure sine wave. Accordingly, a shaping circuit is provided in tube 101 and its associated circuit. These amplify the 50 kc. signal from the cathode follower and improve its wave form. At 102 is shown a parallel anti-resonant circuit tuned to 50 kc. The amplifier produces in the tuned circuit a large circulating current which is of pure sine wave form. The output at the plate will have a corresponding good wave form. This output is applied to the grid of a phase splitter tube 39, which has equal resistances 65 and 66 disposed in its plate and cathode circuits so that equal amplitude voltages 180° out of phase will be developed across each resistance. Nevertheless, for control purposes it is still necessary to shift the phase of these voltages 90° from the input signal to the phase splitter tube 39. This may be done by making the reactances of condensers 67 and 70, which couple the push-pull output from the phase splitter to the control grids of the balanced phase corrector 40, large compared to the grid resistances 68 and 69. Thus, if the push-pull signals to the control grids of tubes 40*a* and 40*b* are suitably balanced by condenser 67 and are exactly 180° out of phase, they will cancel in their plate circuits when their screen grid voltages are balanced and one phase or the other will predominate when their screen grids are not balanced. When the screen grids of tubes 40*a* and 40*b* become unbalanced, the balanced phase corrector 40 will feed a signal back to the cathode resistance 86 of the tube 81 in the oscillator which is either 90° leading or 90° lagging the signal on the plate of tube 81. Naturally, the amount of frequency pulling is dependent upon the amplitude of the feedback signal which is governed by the degree of unbalance of the screen voltages on tubes 40*a* and 40*b* which in turn is a function of the unbalance between the reference voltage applied to the grid on tube 38*b* and the bias voltage applied to the grid of tube 38*a* by the averaging diode 37.

If the distant signal amplitude varies, the control varies. Moderately heavy noise changes slightly the shape of the distant pulse and tends to give false corrections. False corrections may be minimized by connecting the control grids of tubes 40*a* and 40*b* of the balanced phase corrector 40 to the second detector through suitable isolating resistors (not specifically shown), for instance, of the receiver 12 whose negative voltage increases with noise and dilutes the control voltages. Extremely heavy noise cuts off the balanced phase corrector entirely. During these short periods the stability of the crystal will hold synchronism fairly closely.

The amount of control the balanced phase corrector 40 applies to the oscillator is indicated on a D. C. milliammeter 71 connected through a suitable resistance 71 across the plates of the differential amplifiers 38. When the meter is balanced, the plates of the differential amplifier are the same potential. This indicates that the negative gate is at the proper position on the distant pulse signal. If the negative gate pulse is late, and therefore, moves in toward the center of the distant pulse then the meter will deflect in one direction and if it is early the meter will deflect in the opposite direction.

Also connected across the plates of the differential amplifier 38 is a pair of cathode follower tubes 72*a* and 72*b* of the warning circuit 72. Thus any unbalance in the differential amplifier 38 will cause a similar unbalance in voltages developed across the cathode resistors 73 and 74 of the warning circuit 72. This voltage difference causes a current to flow through a relay coil 75 which is disposed across the cathodes of tubes 72*a* and 72*b* and actuates a buzzer alarm, not shown. A large time constant circuit including condenser 76 and grid resistances 77 and 78 disposed in the grid circuit of the warning circuit 72 prevent bursts of noise from actuating the buzzer.

A 10 microfarad condenser 79 and switch 92 couple the negative gate pulse obtained from the plate of tube 55 through lead 94 directly to the lower vertical deflecting plate of the cathode ray tube 13 shown in Fig. 1. Closing of this switch makes the negative gate visible on the remote signal so that the gate width and position can be adjusted by condenser 51 in the negative gate generator 35 and potentiometer 46 in the multivibrator 36 respectively to balance the meter 71 when the gate is about one-half way up the leading edge of the remote signal.

This device can also be used as a monitor only by disconnecting it from the master oscillator entirely and utilizing only the warning signal circuit to indicate loss of synchronization by the distant transmitter which is normally charged with the maintenance of synchronization.

Although I have shown and described only certain and specific embodiments of this invention I am fully aware of the many modifications possible therein.

I claim:

1. A means for maintaining a recurrent series of pulse emissions from a local radio pulse transmitter in a known time relation with a similar recurrent series of pulse emissions from a remote transmitter, comprising a means at said local transmitter for generating a timing wave, means controlling the operation of said local transmitter in response to said timing wave, means receiving at said local transmitter the pulses emitted by said remote transmitter, an amplifying channel, means connecting the output of said receiving means to said amplifying channel, means also responsive to said timing wave for unblocking said amplifying channel at the proper instant to pass a portion of each of said received pulses, means averaging the amplitude of the output pulses from said amplifying channel, a reference voltage source, and means for varying the frequency of said timing wave in sense and amount according to the difference in values between said reference voltage and the average value of the output pulses from said amplifying channel.

2. A means for maintaining a recurrent series of pulse emissions from a local radio pulse transmitter in a known time relation with a similar recurrent series of pulse emissions from a remote transmitter, comprising a means at said local transmitter for generating a timing wave, means controlling the operation of said local transmitter in response to said timing wave, means receiving at said local transmitter the pulses emitted by said remote transmitter, an amplifying channel, means connecting the output of said receiving means to said amplifying channel, means also responsive to said timing wave for unblocking said amplifying channel at the proper instant to pass a portion of each of said received pulses, means averaging the amplitude of the output pulses from said amplifying channel, a reference voltage source, and means responsive to the difference in the amplitudes of the average value of the output pulse from said amplifying channel and said reference voltage for varying the frequency of said timing wave.

3. A means for maintaining a recurrent series of pulse emissions from a local radio pulse transmitter in a known time relation with a similar recurrent series of pulse emissions from a remote radio transmitter, comprising a means at said local transmitter for generating a timing wave, means controlling the operation of said local transmitter in response to said timing wave, means receiving at said local transmitter the pulses emitted by said remote transmitter, an amplifying channel, means connecting the output of said receiving means to said amplifying channel, a pulse generator, means controlling the operation of said pulse generator in response to said timing wave, means for unblocking said amplifying channel in response to the operation of said pulse generator at the proper time to pass a portion of said received pulses, and means controlling the frequency of said timing wave in accordance with the average amplitude of the output pulse from said amplifying channel.

4. A means for maintaining a recurrent series of pulse emissions from a local radio pulse transmitter in a known time relation with a similar recurrent series of pulse emissions from a remote radio transmitter, comprising a means at said local transmitter for generating a timing wave, means controlling the operation of said local transmitter in response to said timing wave, means receiving at said local transmitter the pulses emitted by said remote transmitter, an amplifying channel, means connecting the output of said receiving means to said amplifying channel, a pulse generator, means controlling the operation of said pulse generator in response to said timing wave, means for unblocking said amplifying channel in response to the operation of said pulse generator at the proper time to pass a portion of said received pulses, a reference voltage source, and means controlling the frequency of said timing wave in sense and amount according to the difference in values between said reference voltage and the average amplitude of the output pulse from said amplifying channel.

5. A means for maintaining a recurrent series of pulse emissions from a local radio pulse transmitter in a known time relation with a similar recurrent series of pulse emissions from a remote transmitter, comprising a means at said local transmitter for generating a timing wave, means controlling the operation of said local transmitter in response to said timing wave, means receiving at said local transmitter the pulses emitted by said remote transmitter, an amplifying channel, means connecting the output of said receiving means to said amplifying channel, means also responsive to said timing wave for unblocking said amplifying channel at the instant of arrival of said distant pulse signals and for an interval considerably less than the time duration of said distant pulse signals, means for averaging the amplitude of the output pulses from said amplifying channel, a reference voltage source, and means controlling the frequency of said timing wave in accordance with the difference between the value of said reference voltage and the average amplitude of the output from said amplifying channel.

6. A means for maintaining a recurrent series of pulse emissions from a local radio pulse transmitter in a known time relation with a similar recurrent series of pulse emissions from a distant transmitter, comprising a means for producing a rectangular voltage wave of the desired frequency, means controlling the operation of said local transmitter in response to the trailing edge of the positive half cycles of said rectangular voltage wave, means receiving at said local transmitter the pulse emittance by said distant transmitter, an amplifying channel, means connecting the output of said receiving means to said amplifying channel, means operative in response to the leading edge of said positive half cycles of said rectangular voltage wave for unblocking said amplifying channel, means for phasing the production of said timing wave so as to unblock said amplifying channel at the time of arrival of said distant pulse signal, and means for altering the phase of said rectangular voltage wave in response to the average amplitude of the output pulses from said amplifying channel.

7. A means for maintaining a recurrent series of pulse emissions from a local radio pulse transmitter in a known time relation with a similar recurrent series of pulse emissions from a distant transmitter, comprising a means for producing a rectangular voltage wave of the desired frequency, means controlling the operation of said local transmitter in response to the trailing edge of the positive half cycles of said rectangular voltage wave, means receiving at said local transmitter the pulse emittance by said distant transmitter, an amplifying channel, means connecting the output of said receiving means to said amplifying channel, means operative in response to the leading edge of said positive half cycles of said rectangular voltage wave for unblocking said amplifying channel, means for phasing the production of said rectangular voltage wave so as to unblock said amplifying channel at the time of arrival of said distant pulse signal, means for averaging the amplitude of the output pulses from said amplifying channel, a reference voltage source, and means for altering the phase of said rectangular voltage wave in response to the difference in values between the amplitudes of said reference voltage and said amplitude averaging means.

8. A means for maintaining a recurrent series of pulse emissions from a local radio pulse transmitter in a known time relation with a similar recurrent series of pulse emissions from a local radio pulse transmitter in a known time relation with a similar recurrent series of pulse emissions from a distant transmitter, comprising a means for producing a rectangular voltage wave of the desired frequency, means controlling the operation of said local transmitter in response to the trailing edge of the positive half cycles of said rectangular voltage wave, means receiving at said local transmitter the pulse emittance by said distant transmitter, an amplifying channel, means connecting the output of said receiving means to said amplifying channel, a pulse generator, said pulse generator operative in response to the leading edge of the positive half cycles of said rectangular voltage wave, means unblocking said amplifying channel in response to the operation of said pulse generator, means phasing the production of said rectangular voltage wave so that said amplifying channel will be unblocked at the time of arrival of said distant pulse signal, means for averaging the amplitude of the output pulses from said amplifying channel, a reference voltage source, means for altering the phase of said rectangular voltage wave in response to the difference in amplitudes of the said reference voltage and the output of said averaging means.

9. A means for maintaining a recurrent series of pulse emissions from a local radio pulse transmitter in a known time relation with a similar recurrent series of pulse emissions from a remote transmitter, comprising a means at said local transmitter for generating a timing wave, means controlling the operation of said local transmitter in response to said timing wave, means receiving at said local transmitter the pulses emitted by said remote transmitter, an amplifying channel, means connecting the output of said receiving means to said amplifying channel, means also responsive to said timing wave for unblocking said channel for a time interval considerably less than the time duration of said distant pulse and at a time coincidental with the arrival of said distant pulse, means for averaging the amplitude of the pulse output from said amplifying channel, a reference voltage source, and means feeding back into said timing wave generating means a component of its output voltage which either lags or leads the output timing wave by 90° depending upon the relative sizes of the average output pulse from said amplifying channel and said reference voltage, the amplitude of the feedback component being dependent upon the difference in amplitude of said voltages.

10. A means for maintaining a recurrent series of pulse emissions from a local transmitter in a known time relation with a similar recurrent series of pulse emissions from a remote transmitter comprising, an oscillator at said local transmitter, said oscillator being adapted to have the phase of its output signal controlled by feeding back thereinto a component of its output signal which is out of phase with respect to said output signal by 90°, means controlling the operation of said local transmitter in response to the output of said oscillator, means receiving at said local transmitter the pulses emitted by said remote transmitter, a normally blocked amplifying channel, means connecting the output of said receiving means to said amplifying channel, means also responsive to the output of said oscillator for periodically unblocking said amplifying channel for a time interval considerably less than the time duration of each of said pulses from said remote transmitter and at a time coincidental with the arrival of each of said pulses from said remote transmitter, means for averaging the amplitude of the pulse output from said amplifying channel, said averaging means comprising, a first resistor coupled across the output of said amplifying channel, a unilateral conductive device, a second resistor, said unilateral conductive device and said second resistor being serially connected across the output of said amplifying channel, and at least one capacitor connected in parallel with said second resistor, the average amplitude of the pulse output from said amplifying channel appearing across said capacitor, a differential amplifier comprising at least first and second electron tubes, each of said tubes having at least a cathode, a control grid and an anode, said cathodes being directly connected together, and a resistor for each of said tubes returning the anode of each of said tubes to a suitable source of positive supply potential, a reference voltage source coupled to the control grid of one of said tubes, means coupling the average amplitude voltage appearing across said capacitor to the control grid of the other of said tubes, means coupled to the output of said oscillator for generating first and second equal amplitude signals out of phase with respect to each other by 180° and out of phase with respect to said oscillator output signal by 90°, a balanced phase corrector circuit including first and second electron tubes each including at least an anode, a control grid, a screen grid and a cathode, means for applying each of said first and second signals to the control grid of a separate one of said first and second tubes of said balanced phase corrector, means for coupling each anode of said differential amplifier to the screen grid of a separate one of said first and second tubes of said balanced phase corrector circuit, and means coupling said anodes of said balanced phase corrector tubes together and to said oscillator for controlling the phase of the output signal of said oscillator.

11. A means for maintaining a recurrent series of pulse emissions from a local transmitter in a known time relation with a similar recurrent series of pulse emissions from a remote transmitter comprising, an oscillator at said local transmitter, said oscillator being adapted to have the phase of its output signal controlled by feeding back thereinto a component of its output signal which is out of phase with respect to said output signal by 90°, means controlling the operation of said local transmitter in response to the output signal of said oscillator, means receiving at said local transmitter the pulses emitted by said remote transmitter, a normally blocked amplifying channel, means connecting the output of said receiving means to said amplifying channel, means also responsive to the output of said oscillator for periodically unblocking said amplifying channel for a time interval considerably less than the time duration of each of said pulses from said remote transmitter and at a time coincidental with the arrival of each of said pulses from said remote transmitter, means for averaging the amplitude of the pulse output from said amplifying channel, a reference voltage source, means coupled to the output of said oscillator for generating two equal amplitude signals that are 180° out of phase with respect to each other and 90° out of phase with respect to the output signal of said oscillator, a balanced phase corrector circuit including first and second electron tubes each including an anode, a control grid and a screen grid, said anodes being connected together and returned to said oscillator, means for applying said averaged output of said amplifying channel to the control grid of one of said first and second electron tubes, means for applying said reference voltage to the control grid of the other of said first and second electron tubes, means for applying each of said equal amplitude 180° out of phase, signals to the screen grid of a separate one of said first and second electron tubes, said balanced phase corrector circuit generating at the anodes of said first and second electron tubes, a signal which has one of two phases with respect to said oscillator output signal, one of said phases being 90° leading with respect to said oscillator output signal, the other of said phases being 90° lagging with respect to said oscillator output signal, said signal generated at said anodes having an amplitude dependent upon the difference in amplitudes between said reference voltage and said averaged output of said amplifying channel.

GLENN H. MUSSELMAN.

REFERENCES CITED

The following references are of record in the file of this patent:

UNITED STATES PATENTS

| Number | Name | Date |
|---|---|---|
| 2,048,081 | Riggs | July 21, 1936 |
| 2,185,693 | Mertz | Jan. 2, 1940 |
| 2,196,590 | Koch | Apr. 9, 1940 |
| 2,201,978 | Bedford | May 28, 1940 |
| 2,209,507 | Campbell | July 30, 1940 |
| 2,323,534 | Goddard | July 6, 1943 |
| 2,425,314 | Hansell | Aug. 12, 1947 |
| 2,454,810 | Labin | Nov. 30, 1948 |
| 2,465,925 | Purington | Mar. 29, 1949 |